Sept. 2, 1958 O. A. HOLLAND 2,850,292
FIFTH WHEEL HAVING A REMOTE CONTROLLED LOCKING MECHANISM
Original Filed Aug. 5, 1952 4 Sheets-Sheet 2
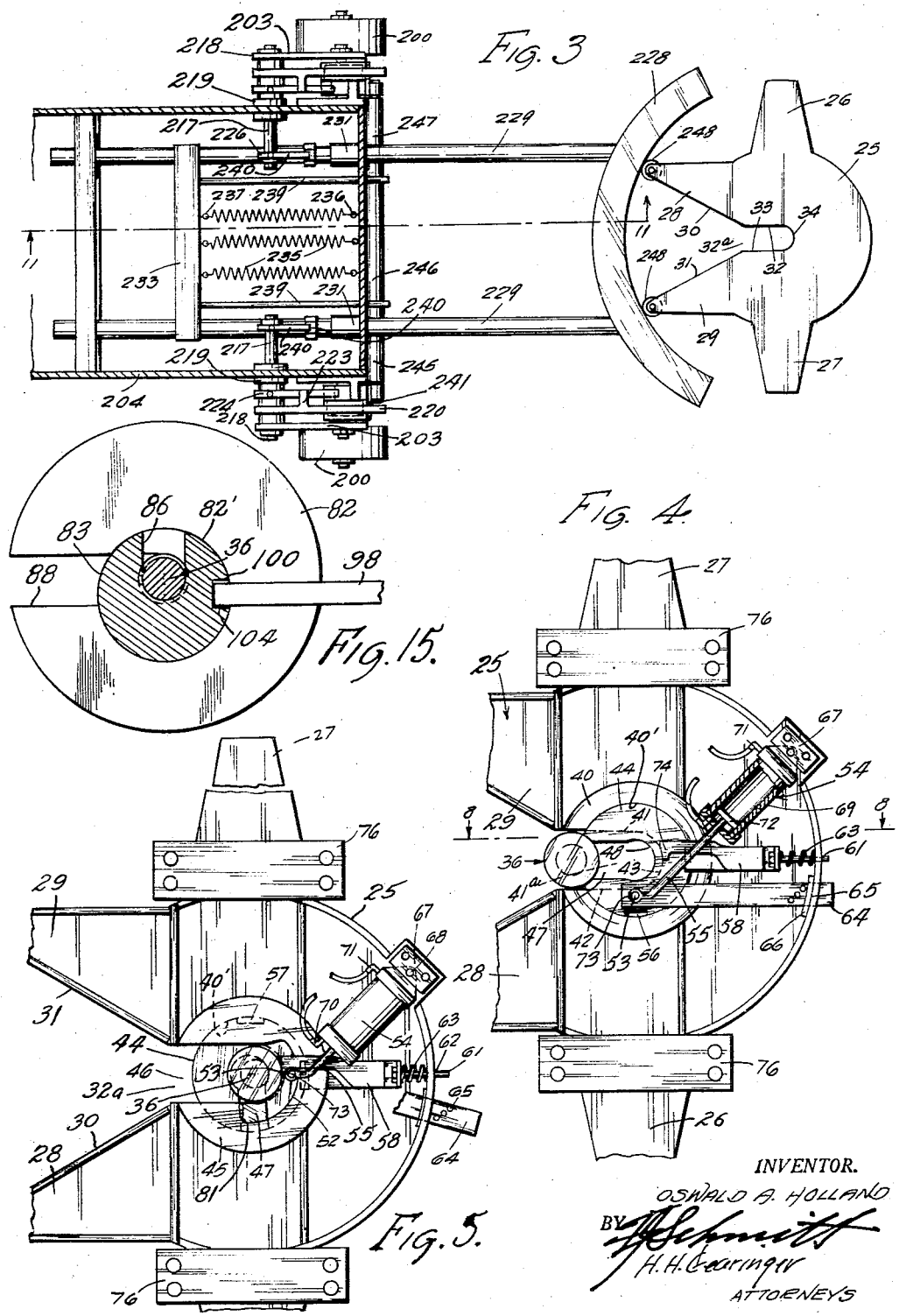
INVENTOR.
OSWALD A. HOLLAND
BY
H. H. Gearinger
ATTORNEYS Sept. 2, 1958     O. A. HOLLAND     2,850,292
FIFTH WHEEL HAVING A REMOTE CONTROLLED LOCKING MECHANISM
Original Filed Aug. 5, 1952     4 Sheets-Sheet 3
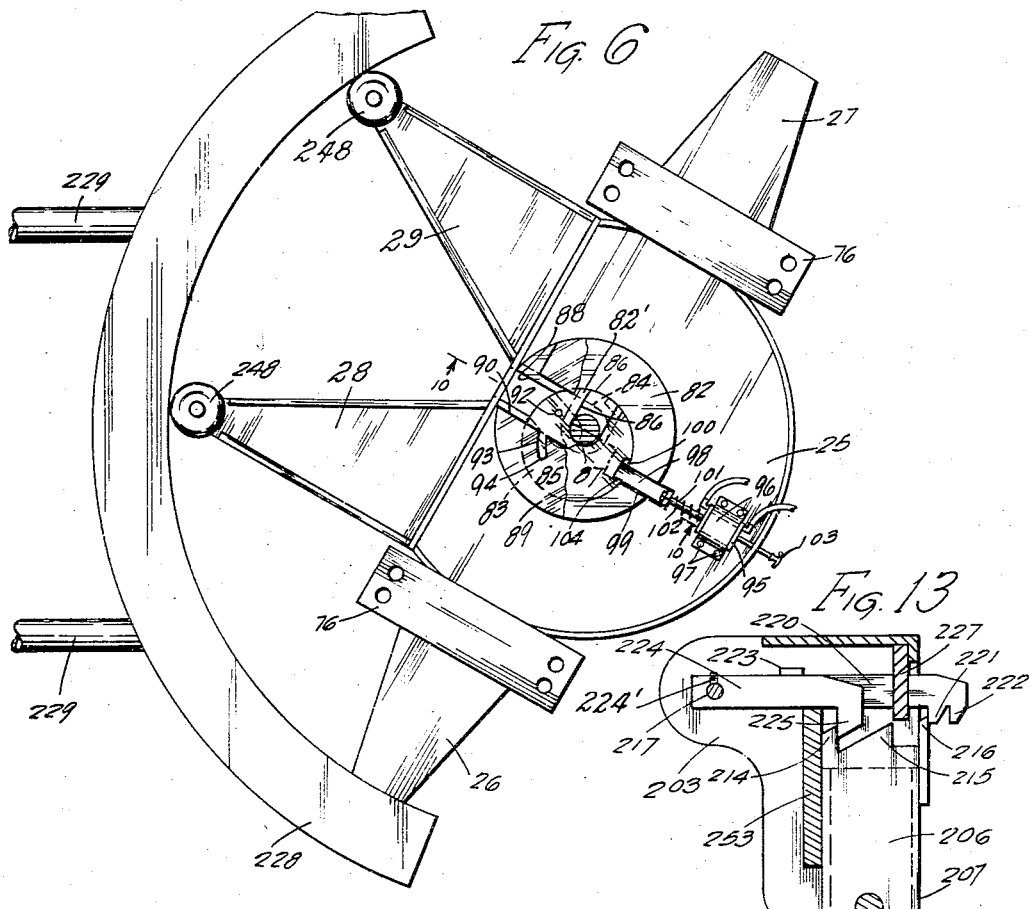
INVENTOR.
OSWALD A. HOLLAND
BY
ATTORNEYS

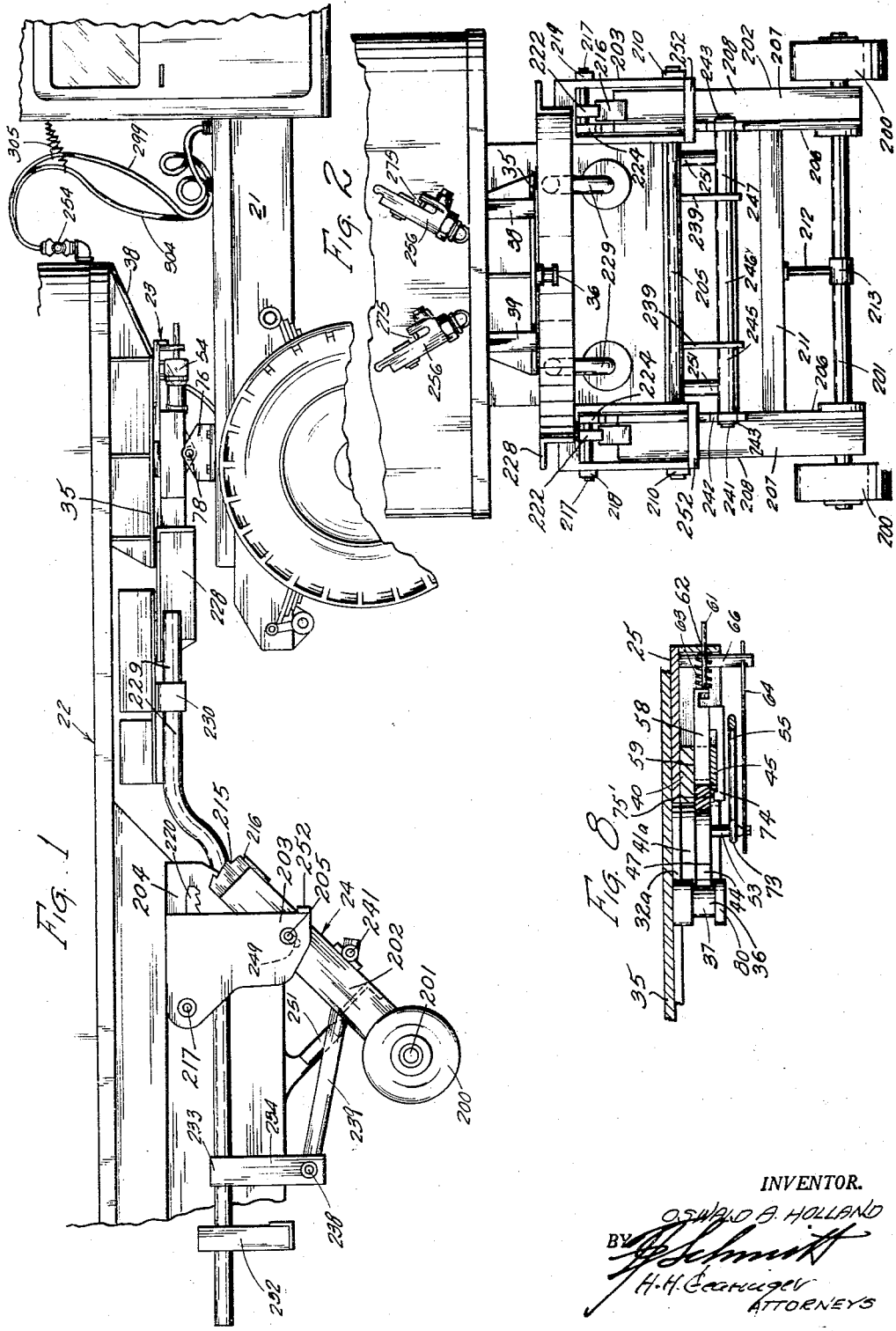

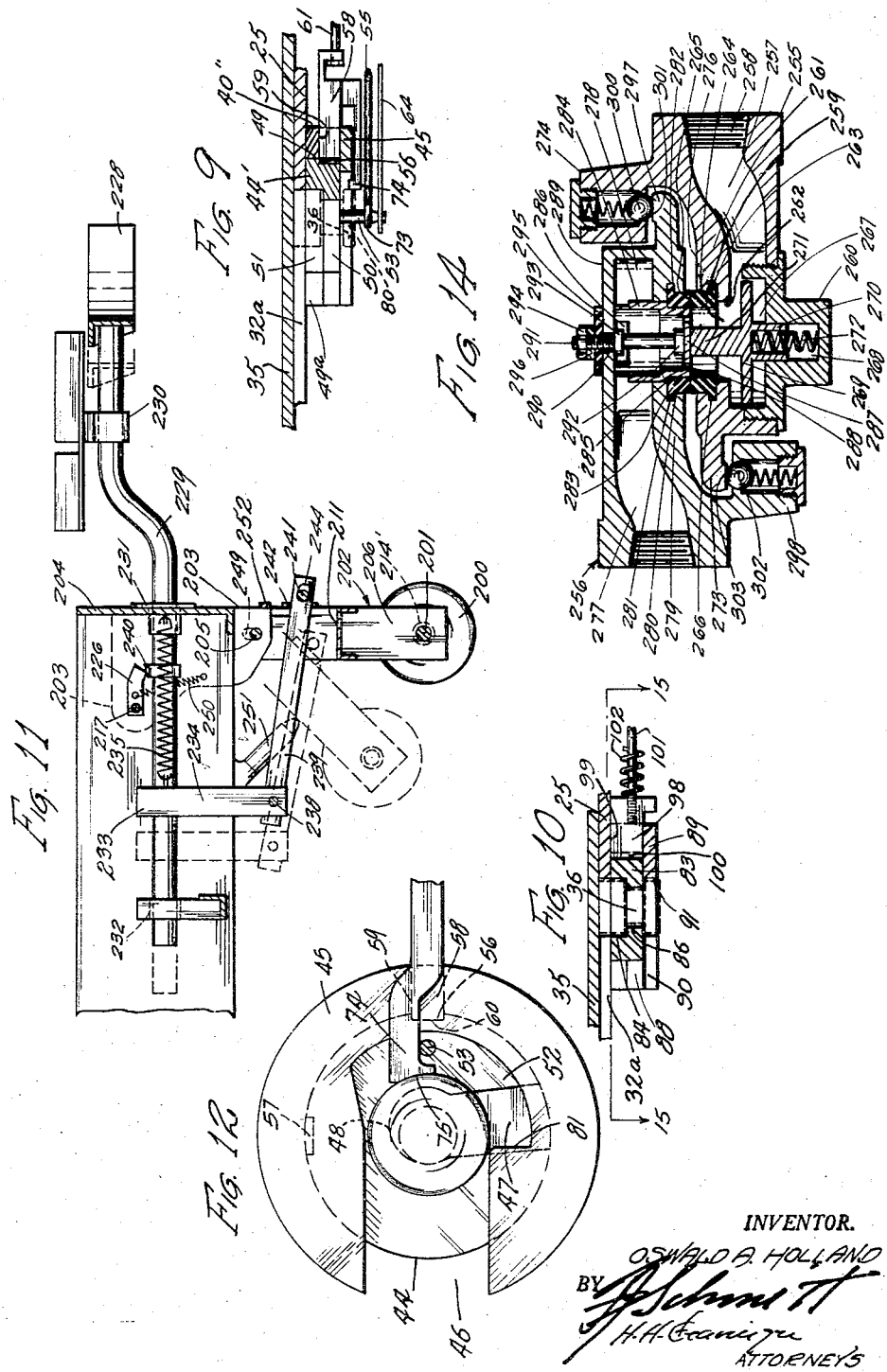

United States Patent Office 2,850,292
Patented Sept. 2, 1958

2,850,292

FIFTH WHEEL HAVING A REMOTE CONTROLLED LOCKING MECHANISM

Oswald A. Holland, Hammonton, N. J.

Continuation of application Serial No. 302,855, August 5, 1952. This application January 23, 1956, Serial No. 560,906

2 Claims. (Cl. 280—434)

(Granted under Title 35, U. S. Code (1952), sec. 266)

The invention described herein may be manufactured and used by or for the Government of the United States of America for governmental purposes without the payment of any royalties thereon or therefor.

This invention relates to the art of motor vehicles and particularly to coupling and uncoupling equipment for truck-tractors and semi-trailers, and is a continuation of my application Serial Number 302,855, filed August 5, 1952, now abandoned.

It is the primary object of this invention to provide new and improved means for coupling and uncoupling tractors and trailers which means are entirely controlled by the driver of the tractor-trailer combination from within the cab of the tractor.

A further object of the invention is to provide a coupling unit or fifth wheel which can be operated to uncouple the tractor from the trailer while the vehicles are moving and with a full load on the trailer.

This invention also contemplates the modification of conventional trailer landing gear so that the landing wheels will automatically be raised when the tractor is backed into coupling position and will be dropped into supporting position when the tractor is driven away from the trailer even when the uncoupling operation is performed while the vehicles are moving.

Still another object of this invention is to provide means for preventing operation of the coupling unit and retraction or lowering of the landing wheels except when the tractor and trailer are in the proper relationship for so doing and the driver has operated the controls in the cab into the position for performing the contemplated operation.

Another object of this invention lies in the modification of air or vacuum supply hose-coupling units so that the units will automatically uncouple when the tractor is driven away from the trailer and will seal off the air or vacuum hose connected to the tractor when the coupling is separated.

Still another and final purpose of the invention is the application of the aforementioned features to conventional tractors and trailers at low cost and without destroying the capability of the tractor or trailer to be coupled to a conventional trailer or tractor respectively.

It is noted that other automatic coupling units or fifth wheels for tractor-trailer combinations have been attempted heretofore. A brief comparison of these old systems with that of applicant will serve to point out several basic differences which should be kept in mind.

First of all, the known devices require that at least the fifth wheel and landing wheels be replaced while in applicant's system only relatively inexpensive modifications to conventional equipment are needed.

Secondly, tractors equipped with automatic couplers other than that of applicant can be utilized only with trailers supplied with similarly modified equipment while a tractor or trailer furnished with applicant's modified units can still be efficiently coupled to standard units.

Thirdly, applicant retains the air or vacuum service brakes on the trailer while others must resort to less efficient mechanical brakes.

Another advantage of applicant's system over that of conventional coupling equipment is that the king pin of the trailer upper fifth wheel is completely enclosed by the units of the lower fifth wheel attached to the tractor and these units may be locked in closed position by power operated means which cannot be inadvertently released, whereas, in conventional fifth wheel assemblies locking jaws only partially encircle the king pin and are subject to failure due to normal wear.

Last, but very important, vehicles equipped with applicant's invention can be uncoupled while the vehicles are in motion and fully loaded without any damage to tractor, trailer or load, a feat which was considered impossible in the past.

The invention herein described has many advantages and wide utility. Its use will reduce to a minimum the possibility of accidental uncoupling of truck tractors and semi-trailers. When used in shifting operations in yards much time can be saved and accidents averted since the driver need never leave the cab as landing wheels are automatically lowered when the tractor is driven away from the trailer and accidental uncoupling is prevented.

The invention could also be employed to great advantage in hauling explosive or inflammable materials, by the Armed Forces in combat, or wherever dangerous activities are carried on, for example on aircraft landing fields; in short, wherever the ability to quickly couple to and remove a trailer from its location may become necessary or where it may be important to quickly separate a tractor from its trailer. It will be apparent that in many emergencies expeditious coupling or uncoupling of a tractor and trailer may prevent loss of valuable equipment or personnel.

Other objects and many of the attendant advantages of this invention will be readily appreciated as the same becomes better understood by reference to the following detailed description when considered in connection with the accompanying drawings wherein:

Figure 1 is a side elevation of the new coupling unit and landing gear shown in coupled position on a tractor and trailer;

Figure 2 is a front elevation of the trailer supported by the improved landing gear and showing hose coupling units which are part of the invention;

Fig. 3 is a top plan view of the landing gear showing how contact between the segment on the landing gear and the lower fifth wheel serves to operate the landing gear;

Fig. 4 is a plan view looking from the bottom of the lower fifth wheel with the fifth wheel in position for receiving the trailer kingpin and the cover plate removed;

Fig. 5 is a view similar to Fig. 4 but with the kingpin engaged and with the detent forced out of its notch in the locking plate by the kingpin;

Fig. 6 shows a modified form of the invention as seen from the underside of the lower fifth wheel with the locking plate in closed position, the open position being shown in phantom;

Fig. 7 shows the lower fifth wheel as it is about to engage the upper fifth wheel and kingpin and the landing gear segment;

Fig. 8 is a cross section taken on line 8—8 of Fig. 4;

Fig. 9 is a cross sectional view of a fifth wheel having a modified locking plate with the kingpin fully engaged but before the locking plate has rotated into closed position;

Fig. 10 shows the modified fifth wheel in cross section taken on line 10—10 of Fig. 6;

Fig. 11 is a section taken on line 11—11 of Fig. 3 and illustrates the landing gear in its alternative positions, demonstrating the relative positions or some of the parts;

Fig. 12 is an enlarged view of the fifth wheel shown in Fig. 5 with some of the parts removed for clarity;

Fig. 13 is a detail view of the landing gear locking mechanism taken on section line 13—13 of Fig. 3;

Fig. 14 illustrates a modified hose coupling unit for use in applicant's invention; and Fig. 15 is an enlarged detail of the center and locking plates shown in Fig. 6.

Looking now at Fig. 1, truck-tractor 21 is shown coupled to semi-trailer 22 by means of the fifth wheel or coupling unit 23. Landing gear 24 appears in its normal attitude when the tractor and trailer are coupled, that is with the landing wheels in raised position.

Referring to Fig. 3, the lower fifth wheel is seen to comprise a generally circular bearing or face plate 25 provided with laterally extending projections 26, 27 and rearwardly extending skid portions 28, 29 which, as shown in Fig. 7, have a slight convex curvature. The confronting edges 30, 31 of the skid portions form a V-shaped slot converging toward the center of the bearing plate 25. This V-shaped slot merges into a second slot 32a having parallel walls 32, 33 and bounded at one end by a semicircular wall 34 which lies substantially concentric with a portion of the side wall of bearing plate 25. Plate 25 is attached to the tractor chassis by supports 76 (Figures 1 and 7) held to the tractor by bolts 77 and pivots on shaft 78 journaled in bearings 79. Due to an unbalance of weight the bearing plate will assume the attitude shown in Fig. 7 when in an inoperative position.

The upper fifth wheel, as shown in Fig. 7, comprises a circular bearing plate 35 which cooperates with the face plate of the lower fifth wheel to support the trailer and a kingpin 36 having a diameter equal to the width of the second slot 32a in the plate 25 and reduced portion 37 intermediate its ends. Oblique guideways or skids 38, 39 (Figure 2) extend from the surface of the bearing plate 35 and are spaced apart a distance substantially equal to the distance between the free ends of skids 28, 29 on the lower fifth wheel.

As shown in the Figure 4 modification, a center plate 40 is fixed to the plate 25 on the side opposite its bearing surface. The center plate 40 comprises a circular disc having a circular recess 40' concentric therewith and extending through about half the thickness of the center plate. A slot 41a bounded by walls 41, 42 and closed at one end by a semicircular wall 43 is formed in the center plate 40 and coincides substantially with slot 32a in the plate 25. A locking plate 44 (Figures 4 and 8) is rotatably fitted into the circular recess of the center plate 40 and is retained therein by a cover plate 45. A slot 46 (Figures 5, 8 and 12), substantially coinciding with the slots in the bearing plate 25 and the center plate 40 is provided in the cover plate 45 and a slot 47 of a width corresponding substantially to the diameter of the reduced portion 37 in the kingpin 36 is formed in the locking plate 44. This slot 47 merges into an arcuate wall 48 which has a diameter slightly larger than the width of slot 47.

In a modified form of the invention shown in Fig. 9, the recess 49 extends through the whole thickness of the center plate 40 and the locking plate 44' is provided with two slots each extending partly through the thickness of the plate, one slot 50 being identical to the slot 47, 48 of the form described above and the other slot 51 substantially coinciding with the slots 32a and 46 in the bearing plate 25 and cover plate 45 respectively. A stepped opening 49a, which comprises substantially an extension of slots 50 and 51 of the locking plate when said plate is in its open position, is provided in the wall of the center plate. The construction and operation of this modification is the same as the form in Figure 4 as explained below.

Projecting from a surface of the locking plate 44 (Figures 5 and 12) and extending through a clearance groove 52 in the cover plate 45 is a locking plate operating pin 53 and pivotally connected to this pin is the actuating arm or shaft 55 (Figure 5) of an electric solenoid or an air or vacuum motor 54. Pin 53 is located on a line approximately 85° from the axis of slot 47 when the slot is in the position shown in Figures 5 and 12. Slidably mounted in a bore 59 (Figures 8 and 12) in center plate 40 and with its end 60 alternatively engaging one of the notches 56, 57 is a detent 58. The other end 61 of the detent is supported in a bearing 62 fixed to the bottom of bearing plate 25. A spring 63 urges the detent into engagement with the notches 56 and 57. An indicator rod 64 having markings 65 is also rotatably attached at one end to pin 53 and is slidably supported intermediate its ends by a support member 66 fixed to the underside of plate 25. A block 67 is also attached to the plate 25 and swively supports the solenoid or fluid motor 54 by means of pins or bolts 68. In the case where 54 is a solenoid, current is supplied to the coil from the tractor electrical system through a switch in the cab of the tractor which can be operated by the driver of the vehicle to provide a flow of current to operate the actuating arm or armature 55 in the direction desired. Where 54 is a vacuum or air motor, a cylinder 69 is provided with fittings 70 and 71 at each end thereof and a piston 72 connected to the shaft 55. A valve in the cab may be operated to supply atmospheric pressure to one end of the cylinder through one of the fittings and either air under pressure from the truck's air supply or vacuum from the intake manifold to the other end of the cylinder to effect operation of the shaft 55, and consequently rotate the locking plate 44 to which the shaft is swively connected by means of eyelet or bearing 73 and operating pin 53. When the locking plate is in open position the markings on indicator rod 64 are not visible and when the locking plate is closed the markings can be seen beyond the edge of plate 25 as shown in Figure 5. A latch dog 74 is rigidly secured to the detent 58 and is offset laterally to provide clearance for the pin 53 and vertically to clear the cover plate 45. The free end of this dog is formed with a cam face 75 which underlies the arcuate wall 48 when the detent is engaged with one of the notches 56, 57 and is provided with a thin boss 75' to bring the end of the cam face into the clearance groove 52 in the cover plate 45.

Supposing that it was desired to couple the tractor to the trailer when the trailer was in a parked position supported on its landing wheels and the locking plate was in the position shown in Fig. 4. The driver would operate the switch or valve in the cab to the position which would cause rotation of the locking plate to the attitude in which it is shown in Fig. 5. However, movement of the locking plate would be prevented by detent 58 being engaged with notch 57 and the locking plate would remain in its open position. The tractor is backed towards the trailer with the king-pin in line with the V-shaped slot 32a in the plate 25. The skids 38, 39 will engage the inclined surfaces 28, 29 and gradually transfer the weight of the trailer from the landing wheels to the bearing plate which will tilt into a horizontal position as the point at which the trailer weight is supported on the plate 25 passes over the shaft 78. The kingpin will be guided into the slots in the bearing plate 25, center plate 40, locking plate 44 and cover plate 45 and as it nears the end of the slots the portion 80 of the kingpin 36 will engage the cam face 75 of the latch dog 74 forcing it and the latch back against the pressure of spring 63, thus releasing the locking plate for actuation by motor 54 to the position shown in Fig. 5. The landing wheels will be raised as hereinafter appears and the markings 65 will be exposed. The tractor is then driven forward and since the diameter of the portion of the slot bounded by wall 48 is slightly larger than the reduced portion of pin 36, the kingpin moves rearward which permits the latch dog 74 to move rearward and the detent 58 to engage the notch 56. The locking plate will thus be retained against rotation, and accidental uncoupling of the trailer while the tractor is moving forward, will be effectively prevented. As seen in the drawings the kingpin is entirely surrounded so that its accidental escape from the lower fifth wheel is unlikely and the pulling force of the tractor is exerted against all of the surface of the kingpin 36 contacted by the bearing plate 25, center plate 40 and locking plate 44. Furthermore, the locking plate is rotated approximately 95° which further helps prevent accidental uncoupling since in normal pulling attitude of the tractor there will be practically no component of force tending to rotate the locking plate. Motor 54 is actuated in a direction to keep the locking plate in its closed position, but should power to the motor fail, detent 58 acts as a safety catch to prevent rotation of the locking plate. Air or vacuum hoses are coupled manually.

When it is desired to uncouple the tractor from the trailer with the vehicles standing, the operator manipulates the controls to the position which will provide power to the motor 54 to open the locking plate. The detent 58 will be engaged with notch 56 and will prevent rotation of plate 44 until the tractor is backed slightly toward the trailer. There is a slight clearance between operating pin 53 and the adjacent edge of the latch dog 74 when the detent 58 is engaged with 56 so that when the tractor is backed the kingpin will strike the cam face 75 causing the latch dog to move back against the pressure of spring 63 and carry the latch with it so that the locking plate 44 is free to rotate. The motor 54 will, thereupon, pivot the plate 44 to its open position. Opening motion of plate 44 stops when pin 53 strikes the abutment 81 at the end of the clearance groove 52 in the cover plate 45. The tractor is then driven forward which permits the landing wheels to be automatically lowered and locked in position and the detent 58 to seat in the notch 57. Air or vacuum hoses are automatically uncoupled.

To unhitch the trailer while the vehicles are moving, the driver need only decelerate momentarily after having operated his controls to the position for opening the locking plate. This will cause the trailer to ride up on the tractor and the kingpin to force the latch out of the notch 56 thus permitting the locking plate to be driven to its open position. Upon re-acceleration of the tractor, the kingpin will slip out of the lower fifth wheel and the tractor will move away from the trailer, the landing gear automatically lowering as this occurs. The air or vacuum hose couplings will also be separated, the portion of the coupling attached to the tractor will be sealed off to prevent loss of air or vacuum supply and the trailer's brakes will be applied to bring the vehicle to a stop, all as hereinafter explained.

In the form of the invention shown in Figures 6, 15 and 10, no motor or solenoid is required to rotate the locking plate. Instead the kingpin causes rotation of the locking plate as it is moved linearly with respect to the lower fifth wheel and the motor or solenoid is utilized only to release or engage the detent.

In this modification center plate 82 is provided with an eccentrically disposed circular aperture 82' extending through the thickness of said plate and locking plate 83 is rotatably disposed in said aperture. Locking plate 83 is formed with a radial slot 84 which extends through about half the thickness of said plate and is closed at one end by a semicircular wall 85. The width of slot 84 is slightly greater than the diameter of the kingpin 36 of the upper fifth wheel so that the kingpin may slide freely in the slot during coupling and uncoupling operations. A second slot 86 of a width slightly greater than the reduced diameter of the kingpin is formed in the remaining thickness of the locking plate 83 overlying slot 84 and terminates in a semicircular wall 87, walls 85 and 87 being concentric with each other and with wall 34 in bearing plate 25 when the locking plate is in its closed position. A stepped opening 88 through the wall of the center plate has a cross-section substantially duplicating the cross-section of slots 84 and 86 in the locking plate 83 and lies in line with the slot 32a in the bearing plate. The locking plate 83 is held in place by a cover plate 89 bolted to the center plate and having therein a slot 90 closed at one end by a semicircular wall 91. Slot 90 coincides with slot 32a in the bearing plate 25. A stop pin 92 projects from the locking plate 83 and cooperates with a curved slot 93 in the cover plate 89 and an abutment 94 to locate the locking plate in its open position so that opening 88 mates with slots 84 and 86 to permit entry or exit of the kingpin. An air or vacuum motor or solenoid 95 is attached to the underside of face plate 25 by means of a yoke 96 and bolts 97 and may be energized to operate a latch or detent 98 which projects through a groove 99 in the centerplate 82 and when the locking plate is in closed position engages notch 100 provided on the periphery of the locking plate. Notch 100 is somewhat wider than the latch to insure engagement of the latch with the notch when the locking plate is revolved to closed position. A shaft 101 actuated by the solenoid or motor 95 extends therethrough and has its one end connected to the detent 98 while its other end carries a removable handle 103 by means of which the detent may be manually operated. A spring 102 is compressed between the detent 98 and the motor housing and urges the detent toward latching position, as a precautionary measure in case of failure of motor 95. During normal operation of the vehicles the motor is energized to thrust the detent into latching position but for uncoupling the tractor from the trailer the operator of the vehicles may actuate the motor by means of controls in the cab of the tractor to withdraw the detent from notch 100. The angle between the end of latch 98 and its edge face 104 is made somewhat less than 90° and the edge of notch 100 is inclined in the same direction. This structure causes to be imposed on the face 104 a component of force tending to urge the detent into the notch 100, thus reducing the possibility of disengagement of the latch when the tractor is pulling the trailer. The force from plate 83 is transmitted to detent 98 near the end 104 in a direction radial to detent 98 (see Figure 15). This radial force in turn is transmitted in a direction normal to face 104. This force normal to the face has a component to the left, or in a direction to keep the detent 98 in the notch.

To uncouple the tractor and trailer when the tractor is pulling the trailer, the driver operates the control in the cab to the position which powers the motor 95 to retract the latch 98 and decelerates momentarily. This deceleration removes pressure from the edge face 104 and permits the latch to be withdrawn from notch 100. Upon re-acceleration of the tractor the kingpin will pull against the wall of slot 86 and owing to the eccentricity of the point of application of this force with respect to the outer periphery of the locking plate 83 and the aperture in center plate 82 a moment of force is created tending to rotate the locking plate to its open position. The plate 83 will continue to turn under the influence of the kingpin until the stop 92 engages abutment 94 in the cover plate 89. In this position of the parts the edges of slots 84 and 86 will substantially coincide with the edges of the opening 88 in the wall of the center plate and the walls of slots 84 and 86 will be disposed at an angle with respect to the walls of the stepped opening 88 and the slot 32a in plate 25. The kingpin 36 will slide out from the lower fifth wheel and upon that happening the landing gear will automatically be lowered, the air or vacuum hose couplings between the tractor and trailer disengaged and the trailer brakes applied.

To couple the vehicles together, with the locking plate open, the driver of the tractor sets the control in the cab for operating the motor 95 in the direction to engage the latch in notch 100. He then backs the tractor toward the trailer so that the kingpin enters the slots 32a and 88 and strikes the wall of slot 84 causing the locking plate 83 to rotate and permitting detent 98 to be driven into the notch 100 in said locking plate. At the same time, the landing wheels will automatically be raised by mechanism to be described shortly. The driver manually couples the air or vacuum hoses between the tractor and trailer.

The landing gear mechanism as seen in Figs. 2 and 11 comprises a pair of landing wheels 200 rotatably mounted on an axle 201 which is journaled in bearing 214' carried in a pair of supports 202, said supports being in the form of box frames or girders having sides 206, 207, 208 and 209 pivotally mounted intermediate their ends by means of elongated holes 249 in sides 206 and 208 on a bracket 203 which is secured to the frame 204 of the trailer and also serves as a housing for part of the mechanism associated with the landing gear. The pivot means for the supports 202 include an axle 205 secured in place by locking collars 210. A crossbar or brace 211 is provided between the supports 202 and to prevent bowing of the axle 201 when a heavily loaded trailer is carried by the landing wheels one end of a brace 212 is attached to said axle by a collar 213 and the other end thereof is fixed to the crossbar 211. The inner side 206 of each of supports 202 is made heavier than the other three sides and at its top or free end is provided with teeth 214 and 215 and the top edge of the front side 207 of the box girder is provided with a tooth 216. A stub shaft 217 has one of its ends journaled in the housing 203 and is journaled intermediate its ends in the trailer frame 204. Locking collars 218 and 219 serve to maintain the stub shaft in position. A safety catch 220, provided with teeth 221 and 222 at its free end is pivotally mounted near one end of the stub shaft within said housing and has secured to its top edge a bar or lifting lug 223 which extends over a pawl 224 which is keyed as at 224' to said stub shaft adjacent the catch 220 and carries a tooth 225 at its free end. A cam follower or lever 226 is keyed near the other end of shaft 217.

When the landing wheels are down in a position to support the trailer, each tooth 225 of the pawls 224 engages tooth 214 on each of the supports 202, each tooth 221 on the safety catch engages its corresponding tooth 216 and a rigid dog 227 on each of the housings 203 cooperates with its respective tooth 215 to maintain the landing gear in proper vertical alignment.

In Fig. 3 are seen an arcuate segment 228 and two push rods or rams 229, each having one end attached to the segment and being slidable in sets of guide bearings, 230, 231 and 232 fixed to the trailer frame. Rigidly secured between the push rods is a horizontal cross beam 233 and depending therefrom are vertical channel members or arms 234 located inwardly of the push rods. Tension springs 235 are strung from eyebolts 236 on the trailer frame to eyebolts 237 on the cross beam and operate to urge the push rods to their extreme forward position. A rod or shaft 238 is carried between the lower ends of the arms 234 and has pivotally mounted thereon near each of its ends a connecting link 239 which provides a connection between the arms and cross beam 233 and the landing wheel supports. A rod 241 is attached to the edge of side 206 of the support frame by means of yokes 242 and collars 243 and passes through an elongated aperture 244 in each of the links 239. Thus a connection is produced which provides for some lost motion between the cross beam 233 and rod 241 to permit easier engagement of the locking means associated with the teeth 214, 215 and 216. Spacers 245, 246 and 247 may be provided to maintain alignment of links 239.

When the tractor 21 is backed toward trailer 22 for coupling, the upper fifth wheel rides up on skid portions 28, 29 and the trailer is lifted onto the lower fifth wheel carried by the tractor. This causes relative vertical motion between housing 203 and supports 202 because of the elongated holes 249 sufficient to disengage dogs 227 from teeth 215, pawl 224 and catch 220 remaining engaged. Further relative movement of the tractor toward the trailer causes rollers 248 on the ends of skid portions 28, 29 to engage the inner periphery of the segment 228 and force it back, causing the push rods to slide in their bearings against the resistance of springs 235 carrying cross beam 233, vertical arms 234 and links 239 with them. A cam 240 secured to each of the push rods strikes the cam follower 226 when backward motion of the rams 229 begins and causes the cam follower to rotate stub shaft 217 to which it is keyed against the pressure of a spring 250, disengaging pawl 224 from tooth 214. As pawl 224 is raised it contacts the lifting lug 223 and lifts safety catch 220 out of engagement with tooth 216. Supports 202 are now free to rotate about axle 205 as links 239 continue to pull back on rod 241 until the brace 211 engages bumpers or rebound stops 251 which prevent rebound when the landing gear is lifted as described and preclude bouncing of said landing gear when the vehicles are driven over bumpy roads and supports 202 engage abutments 252 and 253 of the housing 203. Springs 235 and rebound stops 251 provide a shock absorber action to relieve some of the shock of the impact between the tractor and trailer when the tractor is moved into coupling position, thus reducing the possibility of damage to parts. Cam 240 will move out from under follower 226 allowing stub shaft 217 to rotate so that pawl 224 and catch 220 will be in position to engage the teeth 215 on box frame 202 when it is again swung to trailer supporting position. The upper edge of abutment 253 of the housing limits downward movement of the pawl 224 and catch 225. By providing individual stub shafts 217 rather than a continuous shaft, better engagement of the teeth and latch means is obtained, since failure of the latch means on one side to rotate to fully engaging position will not affect engagement of the latch means on the other side.

The landing wheels will be held in the raised position by the rollers on the ends of the lower fifth wheel engaging the segment 228 wherever the vehicles are coupled together. To provide a more even pressure on said segment and greater stability of the vehicles when the tractor and trailer are being jack-knifed or driven in a sharp turn, lateral extensions 26, 27 have been provided on the lower fifth wheel to engage the segment 228 when the vehicles are at a relatively steep angle with respect to each other as shown in Figure 6.

When the vehicles are being uncoupled and the lower fifth wheel moves away from segment 228, the push rods will move forward under the influence of springs 235 and the wheels will be driven to their supporting position by the weight of the landing gear and by the thrust of springs 235 acting through arms 234 and links 239 until the sides 207 of the box frames impinge upon the stop members 252 and 253 fastened across the front and rear respectively of each housing 203. Cam 240 will move to a position with respect to the follower 226 which will permit rotation of the stub shaft sufficient to engage catch 220 and pawl 224 with teeth 216 and 214 respectively and as the lower fifth wheel moves completely out of trailer supporting position, the weight of the trailer will be transferred to the landing gear as axle 205 moves downwardly in the elongated holes 249 permitting dogs 227 to engage teeth 215.

If by reason of unevenness in the road surface or some other cause proper engagement of teeth 214, 215 and 216 is not effected due to the supports 202 not reaching the full vertical position, tooth 222 of the safety catch will engage tooth 216 so that the trailer may still be supported by the landing gear.

When the upper fifth wheel has become completely disengaged from the lower fifth wheel and the tractor continues to be driven from the trailer until the slack in any vacuum or pressure hose lines between the tractor and trailer is taken up, additional relative movement of the tractor from the trailer will cause the hose couplings 254 to be separated as hereinafter described.

Hose couplings 254 each include a first coupling unit 255 and a second coupling unit 256, said first coupling unit being attached to the hose connected to the tractor and said second coupling unit being attached to the air or vacuum line on the trailer.

The first coupling unit comprises a hollow throat portion 257 internally threaded as at 258 near its free end to receive a hose fitting and merging into a circular chamber 259, said chamber also being internally threaded to receive a shouldered plug 260. End plate 261 of chamber 259 has a central bore 262 and is provided with an annular recess 263 opening into said bore. A flanged resilient washer 264 of rubber or the like material is located in said bore with face 265 of said washer projecting beyond outer face 276 of said end plate and the flange 266 of the washer being confined in the recess 263. Plug 260 is counterbored as at 267 and has a reduced central bore 268. A valve disc 269 having cylindrical axial projections 270 and 271 extending from its opposite faces serves to close the bore 262 to prevent the flow of fluid through the throat portion of said first coupling unit. Projection 270 is slidably fitted into reduced bore 268 and is counterbored to receive a compression spring 272 which normally urges the valve disc into closing position. The opposite projection 271 passes through the bore 262 and in the closed position of the valve protrudes substantially beyond the free face of washer 264. A sector 273 is arranged radially on the periphery of chamber 259 opposite the throat portion 257 and extends for approximately 30° on either side of the longitudinal center line passing through said throat portion. An arcuate locking lug 274 is formed integrally with coupling unit 255 and located diametrically opposite sector 273 spaced from the face 276 and a stop pin not shown, extends between one end of locking lug 274 and outer face 276 of the end plate 261.

Unit 256 likewise has a hollow throat portion 277, cylindrical chamber 278 having its one end closed by end plate 279 which is provided with a bore 280 and with an annular recess 281 opening into said bore. The annular recess receives flange 282 of a flanged resilient washer 283. A cup shaped strainer 284, having a closed end 287, projects through the washer and is retained by a shoulder 285 which engages the washer. The strainer is provided with cutout portions 286 in its wall adjacent its open end and with passages 288 consisting of a series of drilled holes adjacent the edges of the closed end 287. The other end 289 of chamber 278 is formed integrally therewith and is provided with a drilled hole 290 located centrally of the end 289. A bolt 291 projects through hole 290 with its head 292 providing an abutment which engages the center of the closed end of the strainer. An adjustable shoulder 293 on bolt 291 engages one side of the end 289 of the chamber and cooperates with a nut 294 on the other side of end 289 to hold the bolt in adjusted position. A seal is effected by means of washer 295 backed by washer 296 and located under the nut 294. It may be seen that when the two coupling units are placed together in face to face relation, the closed end of the strainer will abut projection 271 of the valve disc and force it back thus allowing the flow of fluid from throat portion 257 through the valve and into throat portion 277. A passage for fluids is thereby provided between the tractor and the trailer.

The remaining structure of coupling unit 256 is similar to that of unit 255, there being a sector 297, a locking lug 298 and a stop pin, 275. To couple the units 255 and 256, they are placed in face to face relation with their longitudinal center lines approximately 90° removed and with the stop pins adjacent each other. The units are then pressed together to engage sector 273 underneath lug 298 and sector 297 underneath lug 274 and rotated until an edge of sector 297 engages the stop pin on unit 255 and an edge of sector 273 engages stop pin 275. At this point, a spring pressed ball detent 300 in locking lug 274 drops into a notch 301 provided in sector 297 and a similar ball detent 302 in lug 298 mates with a notch 303 in sector 273 to help maintain the units in assembled position.

Whenever the tractor is uncoupled from the trailer and moved away, slack is taken up on hoses 299 and 304 which extend from the air, vacuum or other fluid supply on the tractor to the trailer. This tensions support springs 305 causing a pulling force to be imposed on coupling 254. This force rotates unit 255 with respect to unit 256 and when the units are rotated approximately 60° relative to each other so that sectors 273 and 297 are disengaged from locking lugs 298 and 274 respectively, the units will come apart and spring 272 will seat the valve disc 269 sealing off the supply hose. Coupling units 256, attached to the trailer are disposed at an angle to facilitate coupling and uncoupling of the fluid lines. Conventional equipment on trailers will respond to a break in the fluid line which causes the line to impose atmospheric pressure on the equipment by applying the trailer brakes. Therefore, when the tractor and trailer are uncoupled and the units 255 and 256 separated from each other, unit 256 will open to the atmosphere and the trailer brakes will be applied, bringing the trailer to a stop supported by its landing wheels which will also have been lowered by the uncoupling process as hereinbefore described.

It may be seen, therefore, that applicant has provided safe, efficient means controlled by the driver of the vehicles for coupling and uncoupling a truck-tractor and semi-trailer wherein only the fluid supply hose need be coupled manually and wherein the entire uncoupling process requires no manual operations outside the cab and may be performed while the vehicles are moving.

Applicant prefers to fabricate the fifth wheel and landing gear units from steel plate though they may be cast as in the conventional practice. The parts may be stamped out and welded or otherwise joined. The fabricated construction eliminates cracking and distortion encountered with cast steel parts and enhances durability and strength of the fifth wheel and landing gear.

Obviously many modifications and variations of the present invention are possible in the light of the above teachings. It is, therefore, to be understood that within the scope of the appended claims the invention may be practiced otherwise than as specifically described.

What is claimed is:

1. In a fifth wheel assembly for a truck and trailer; a bearing plate mounted on the trailer; a kingpin which is secured to the trailer bearing plate and extends downwardly therefrom, said kingpin having a reduced diameter portion intermediate its ends; a base plate mounted on the truck, said base plate having an exposed upper bearing surface for selective engagement with the trailer mounted bearing plate, said base plate also having an elongated slot which extends inwardly from a peripheral edge of the base plate and terminates on an internal substantially semi-circular wall; an annular center plate secured to the base plate on a side opposite its bearing surface, said center plate having a slot in alignment with the slot in the base plate; a circular locking plate rotatably positioned within the annular center plate, said locking plate having a slot and a centrally disposed bore, said slot extending betwene the bore in the locking plate and its peripheral edge, the width of the locking plate slot being but slightly greater than the reduced diameter portion of the kingpin, and the diameter of the said bore being greater than the reduced diameter portion of the kingpin a predetermined amount but less than the diameter of the end portions of the kingpin, said locking plate also having a pair of notches in its peripheral edge, one notch being substantially opposite the slot in the locking plate and the other notch being substantially at right angles therewith; a detent slideably positioned on the base plate opposite the base plate slot and engageable with either of the notches in the locking plate; a latch dog rigidly secured to the detent and disposed such that said dog extends beyond the base plate semi-circular wall when the detent engages either of said notches; an air motor connected at one end to the locking plate and at its other end to the base plate; and control means for the air motor whereby full control of the rotary disposition of the locking plate within the base plate between its two detent notch engaging positions is maintained.

2. In a fifth wheel assembly for a trailer and a truck having a cab; a bearing plate mounted on the trailer; a kingpin which is secured to the trailer bearing plate and extends downwardly therefrom, said kingpin having a reduced diameter portion intermediate its ends; a base plate mounted on the truck, said base plate having an exposed upper bearing surface for selective engagement with the trailer mounted bearing plate, said base plate also having an elongated slot which extends inwardly from a peripheral edge of the base plate and terminates on an internal substantially semi-circular wall; an annular center plate secured to the base plate on a side opposite its bearing surface, said center plate having a slot in alignment with the slot in the base plate; a circular locking plate rotatably positioned within the annular center plate, said locking plate having a slot and a centrally disposed bore, said slot extending between the bore in the locking plate and its peripheral edge, the width of the locking plate slot being but slightly greater than the reduced diameter portion of the kingpin, and the diameter of the said bore being greater than the reduced diameter portion of the kingpin a predetermined amount but less than the diameter of the end portions of the kingpin, said locking plate also having a pair of notches in its peripheral edge, one notch being substantially opposite the slot in the locking plate and the other notch being substantially at right angles therewith; a detent slideably positioned on the base plate opposite the base plate slot and engageable with either of the notches in the locking plate; a latch dog rigidly secured to the detent and disposed such that said dog extends beyond the base plate semi-circular wall when the detent engages either of said notches; an air motor connected at one end to the locking plate and at its other end to the base plate; and means in the cab for controlling energization of the air motor thereby determining the rotary disposition of the locking plate within the base plate between its two detent notch engaging positions.

References Cited in the file of this patent

UNITED STATES PATENTS

| 1,922,359 | Edwards | Aug. 15, 1933 |
| 2,072,661 | Walther et al. | Mar. 2, 1937 |
| 2,140,990 | Emrich | Dec. 20, 1938 |
| 2,277,179 | Winn | Mar. 24, 1942 |
| 2,367,550 | Winn | Jan. 16, 1945 |
| 2,623,753 | Madigan | Dec. 30, 1952 |

FOREIGN PATENTS

| 556,357 | Germany | Aug. 23, 1932 |